(12) United States Patent
Francescangeli

(10) Patent No.: US 10,425,276 B2
(45) Date of Patent: Sep. 24, 2019

(54) PROVISIONING AN APPLIANCE FOR NETWORK CONNECTIVITY

(71) Applicant: ELECTROLUX HOME PRODUCTS, INC., Charlotte, NC (US)

(72) Inventor: Giorgio Francescangeli, Cornelius, NC (US)

(73) Assignee: ELECTROLUX HOME PRODUCTS, INC., Charlotte, NC (US)

( * ) Notice: Subject to any disclaimer, the term of this patent is extended or adjusted under 35 U.S.C. 154(b) by 563 days.

(21) Appl. No.: 14/694,648

(22) Filed: Apr. 23, 2015

(65) Prior Publication Data
US 2016/0315810 A1    Oct. 27, 2016

(51) Int. Cl.
| | |
|---|---|
| H04L 12/24 | (2006.01) |
| H04W 48/20 | (2009.01) |
| H04W 76/14 | (2018.01) |
| H04W 84/12 | (2009.01) |

(52) U.S. Cl.
CPC ......... *H04L 41/0806* (2013.01); *H04W 48/20* (2013.01); *H04W 76/14* (2018.02); *H04W 84/12* (2013.01)

(58) Field of Classification Search
CPC .. H04L 41/0806; H04W 76/023; H04W 84/12
See application file for complete search history.

(56) References Cited

U.S. PATENT DOCUMENTS

| | | | |
|---|---|---|---|
| 8,625,552 B2 | 1/2014 | Gupta et al. | |
| 8,665,744 B2 | 3/2014 | Viswanathan et al. | |
| 8,868,038 B2 | 10/2014 | Cherian et al. | |
| 2003/0142641 A1* | 7/2003 | Sumner | H04L 63/0428 370/328 |
| 2005/0025182 A1* | 2/2005 | Nazari | H04W 88/06 370/469 |
| 2012/0159607 A1 | 6/2012 | Wei et al. | |

(Continued)

FOREIGN PATENT DOCUMENTS

| | | |
|---|---|---|
| EP | 2 611 079 A1 | 7/2013 |
| WO | 2013/015656 A2 | 1/2013 |

OTHER PUBLICATIONS

International Preliminary Report on Patentability dated Oct. 24, 2017 in International Application No. PCT/US2016/028926 filed Apr. 22, 2016.

*Primary Examiner* — Mohammad S Anwar
(74) *Attorney, Agent, or Firm* — Womble Bond Dickinson (US) LLP

(57) ABSTRACT

An apparatus integral with or directly coupled to an appliance is provided. The apparatus may connect to a user device at the apparatus configured to operate as a wireless local area network (WLAN) access point. The apparatus may receive a command over the connection from the user device to cause the apparatus to scan for one or more available WLAN(s) and obtain one or more service set identifiers (SSIDs) of the available WLAN(s). The apparatus may send the SSID(s) over the connection to the user device for display and user selection of a selected SSID of the SSID(s), with the selected SSID being of a selected WLAN of the available WLAN(s). And the apparatus may receive the selected SSID over the connection from the user device to enable the apparatus to connect directly to the selected WLAN as a WLAN station using the selected SSID.

20 Claims, 8 Drawing Sheets

(56) References Cited

U.S. PATENT DOCUMENTS

| | | | |
|---|---|---|---|
| 2012/0324119 A1 | 12/2012 | Imes et al. | |
| 2013/0173811 A1 | 7/2013 | Ha et al. | |
| 2013/0214935 A1 | 8/2013 | Kim et al. | |
| 2013/0217359 A1 | 8/2013 | Cherian et al. | |
| 2013/0282903 A1 | 10/2013 | DeLuca | |
| 2013/0286899 A1 | 10/2013 | Rist et al. | |
| 2013/0311610 A1 | 11/2013 | Kim et al. | |
| 2013/0325939 A1 | 12/2013 | Shim et al. | |
| 2014/0031992 A1 | 1/2014 | Bergman et al. | |
| 2014/0040444 A1 | 2/2014 | Lee et al. | |
| 2014/0067094 A1 | 3/2014 | Park et al. | |
| 2014/0067131 A1 | 3/2014 | Park et al. | |
| 2014/0156081 A1 | 6/2014 | Ha | |
| 2014/0156082 A1 | 6/2014 | Ha | |
| 2014/0197934 A1 | 7/2014 | Ha | |
| 2014/0233406 A1* | 8/2014 | Chhabra | H04W 48/14 370/252 |

\* cited by examiner

PROVISIONING AN APPLIANCE FOR NETWORK CONNECTIVITY

TECHNOLOGICAL FIELD

The present disclosure relates generally to appliances and, in particular, to provisioning an appliance for network connectivity.

BACKGROUND

In recent years, there has been rapid advancement in low-cost home networking solutions as well as increasing consumer sophistication in deploying and maintaining home local area networks (LANs), such as wireless LANs (WLANs). As a result, home LANs are now ubiquitous and an increasing number of consumer products now offer networking capability supporting connectivity to a home LAN. Progress also continues to be made toward the conceptual "connected home" in which a multitude of consumer devices within a home are interconnected via a network for purposes of information sharing and automation among multiple devices in a home. For example, many household appliances now offer network connectivity supporting connectivity to a home LAN as well as communication with devices outside the home LAN via a wider area network such as the Internet.

BRIEF SUMMARY

Example implementations of the present disclosure provide improved apparatuses and methods for provisioning an appliance for network connectivity. The present disclosure includes, without limitation, the following example implementations:

Example Implementation 1

An apparatus integral with or directly coupled to an appliance, wherein such an apparatus comprises a processor and a memory storing executable instructions that in response to execution by the processor cause the apparatus and thereby the appliance to at least connect to a user device at the apparatus configured to operate as a wireless local area network (WLAN) access point, and thereby establish a wireless connection with the user device; receive a command over the wireless connection from the user device to cause the apparatus to scan for one or more available WLANs and obtain service set identifiers (SSIDs) of the one or more available WLANs; send the one or more SSIDs over the wireless connection to the user device for display and user selection of a selected SSID of the one or more SSIDs, the selected SSID being of a selected WLAN of the one or more available WLANs; and receive the selected SSID over the wireless connection from the user device to enable the apparatus to connect directly to the selected WLAN as a WLAN station using the selected SSID.

Example Implementation 2

The apparatus of any preceding or subsequent example implementation, or combinations thereof, wherein the user device is configured to prompt the user for a password for the selected WLAN, and receive the password manually entered by the user, and wherein the apparatus being caused to receive the selected SSID includes being caused to receive the selected SSID and the password from the user device to enable the appliance to connect directly to the selected WLAN as a WLAN station using the selected SSID.

Example Implementation 3

The apparatus of any preceding or subsequent example implementation, or combinations thereof, wherein the apparatus being caused to receive the selected SSID and the password from the user device includes being caused to receive the selected SSID, the password and an identifier associated with a user account with a service platform configured to provide one or more services for the appliance, and wherein the memory stores further executable instructions that in response to execution by the processor cause the apparatus and thereby the appliance to further send the identifier to the service platform via the selected WLAN to enable the service platform to bind the appliance to the user account.

Example Implementation 4

The apparatus of any preceding or subsequent example implementation, or combinations thereof, wherein the apparatus being caused to receive the selected SSID from the user device includes being caused to receive the selected SSID and an identifier associated with a user account with a service platform configured to provide one or more services for the appliance, and wherein the memory stores further executable instructions that in response to execution by the processor cause the apparatus and thereby the appliance to further send the identifier to the service platform via the selected WLAN to enable the service platform to bind the appliance to the user account.

Example Implementation 5

The apparatus of any preceding or subsequent example implementation, or combinations thereof, wherein the apparatus is caused to connect to the user device without authentication of the user device or appliance to the other and without user authentication to either the user device or appliance.

Example Implementation 6

An apparatus comprising a processor and a memory storing executable instructions that in response to execution by the processor cause the apparatus to at least connect to the appliance configured to operate as a wireless local area network (WLAN) access point, and thereby establish a wireless connection with the appliance; send a command over the wireless connection to the appliance to cause the appliance to scan for one or more available WLANs and obtain service set identifiers (SSIDs) of the one or more available WLANs; receive the one or more SSIDs over the wireless connection from the appliance; display the one or more SSIDs for user selection of a selected SSID of the one or more SSIDs, the selected SSID being of a selected WLAN of the one or more available WLANs; and send the selected SSID over the wireless connection to the appliance to enable the appliance to connect directly to the selected WLAN as a WLAN station using the selected SSID.

Example Implementation 7

The apparatus of any preceding or subsequent example implementation, or combinations thereof, wherein the memory stores further executable instructions that in response to execution by the processor cause the apparatus to further prompt the user for a password for the selected WLAN, and receive the password manually entered by the user, and wherein the apparatus being caused to send the selected SSID includes being caused to send the selected SSID and the password to the appliance to enable the appliance to connect directly to the selected WLAN as a WLAN station using the selected SSID.

Example Implementation 8

The apparatus of any preceding or subsequent example implementation, or combinations thereof, wherein the apparatus being caused to send the selected SSID and the password to the appliance includes being caused to send the selected SSID, the password and an identifier associated with a user account with a service platform configured to provide one or more services for the appliance, the appliance being configured send the identifier to the service platform via the selected WLAN to enable the service platform to bind the appliance to the user account.

Example Implementation 9

The apparatus of any preceding or subsequent example implementation, or combinations thereof, wherein the apparatus being caused to send the selected SSID to the appliance includes being caused to send the selected SSID and an identifier associated with a user account with a service platform configured to provide one or more services for the appliance, the appliance being configured send the identifier to the service platform via the selected WLAN to enable the service platform to bind the appliance to the user account.

Example Implementation 10

The apparatus of any preceding or subsequent example implementation, or combinations thereof, wherein the apparatus is caused to connect to the appliance without authentication of the apparatus or appliance to the other and without user authentication to either the apparatus or appliance.

Example Implementation 11

A method of provisioning an appliance for network connectivity, wherein such a method comprises at the appliance connecting to a user device at the appliance configured to operate as a wireless local area network (WLAN) access point, and thereby establishing a wireless connection with the user device; receiving a command over the wireless connection from the user device to cause the appliance to scan for one or more available WLANs and obtain service set identifiers (SSIDs) of the one or more available WLANs; sending the one or more SSIDs over the wireless connection to the user device for display and user selection of a selected SSID of the one or more SSIDs, the selected SSID being of a selected WLAN of the one or more available WLANs; and receiving the selected SSID over the wireless connection from the user device to enable the appliance to connect directly to the selected WLAN as a WLAN station using the selected SSID.

Example Implementation 12

The method of any preceding or subsequent example implementation, or combinations thereof, wherein the user device is configured to prompt the user for a password for the selected WLAN, and receive the password manually entered by the user, and wherein receiving the selected SSID includes receiving the selected SSID and the password from the user device to enable the appliance to connect directly to the selected WLAN as a WLAN station using the selected SSID.

Example Implementation 13

The method of any preceding or subsequent example implementation, or combinations thereof, wherein receiving the selected SSID and the password from the user device includes receiving the selected SSID, the password and an identifier associated with a user account with a service platform configured to provide one or more services for the appliance, and wherein the method further comprises at the appliance, sending the identifier to the service platform via the selected WLAN to enable the service platform to bind the appliance to the user account.

Example Implementation 14

The method of any preceding or subsequent example implementation, or combinations thereof, wherein receiving the selected SSID from the user device includes receiving the selected SSID and an identifier associated with a user account with a service platform configured to provide one or more services for the appliance, and wherein the method further comprises at the appliance, sending the identifier to the service platform via the selected WLAN to enable the service platform to bind the appliance to the user account.

Example Implementation 15

The method of any preceding or subsequent example implementation, or combinations thereof, wherein connecting to the user device occurs without authentication of the user device or appliance to the other and without user authentication to either the user device or appliance.

Example Implementation 16

A method of provisioning an appliance for network connectivity, wherein such a method comprises at a user device connecting to the appliance configured to operate as a wireless local area network (WLAN) access point, and thereby establishing a wireless connection with the appliance; sending a command over the wireless connection to the appliance to cause the appliance to scan for one or more available WLANs and obtain service set identifiers (SSIDs) of the one or more available WLANs; receiving the one or more SSIDs over the wireless connection from the appliance; displaying the one or more SSIDs for user selection of a selected SSID of the one or more SSIDs, the selected SSID being of a selected WLAN of the one or more available WLANs; and sending the selected SSID over the wireless connection to the appliance to enable the appliance to connect directly to the selected WLAN as a WLAN station using the selected SSID.

Example Implementation 17

The method of any preceding or subsequent example implementation, or combinations thereof, wherein the method further comprises at the user device prompting the user for a password for the selected WLAN, and receiving the password manually entered by the user, wherein sending the selected SSID includes sending the selected SSID and the password to the appliance to enable the appliance to connect directly to the selected WLAN as a WLAN station using the selected SSID.

Example Implementation 18

The method of any preceding or subsequent example implementation, or combinations thereof, wherein sending the selected SSID and the password to the appliance includes sending the selected SSID, the password and an identifier associated with a user account with a service platform configured to provide one or more services for the appliance, the appliance being configured send the identifier to the service platform via the selected WLAN to enable the service platform to bind the appliance to the user account.

Example Implementation 19

The method of any preceding or subsequent example implementation, or combinations thereof, wherein sending the selected SSID to the appliance includes sending the selected SSID and an identifier associated with a user account with a service platform configured to provide one or more services for the appliance, the appliance being configured send the identifier to the service platform via the selected WLAN to enable the service platform to bind the appliance to the user account.

Example Implementation 20

The method of any preceding or subsequent example implementation, or combinations thereof, wherein connecting to the appliance occurs without authentication of the user device or appliance to the other and without user authentication to either the user device or appliance.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will therefore be appreciated that the above Summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
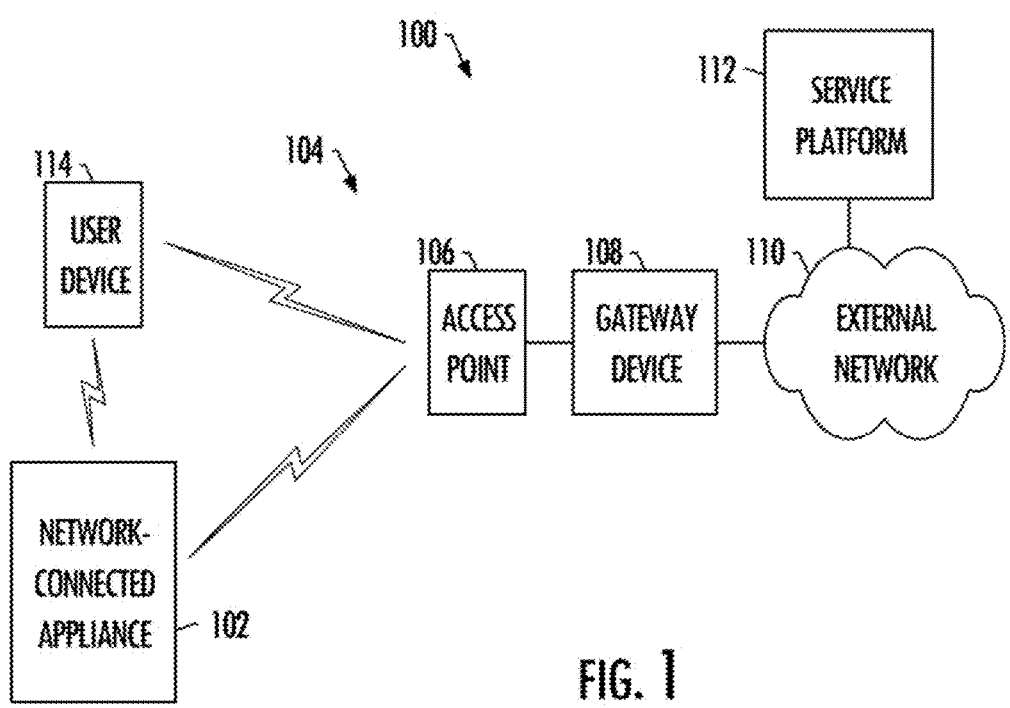
FIG. 1 is an illustration of a system according to various example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

FIG. 1 illustrates a system 100 for provisioning an appliance 102 for network connectivity, and configuring the network-connected appliance to use a home automation system, according to various example implementations of the present disclosure. The system of example implementations may be suitable for any of a number of different types of appliances. Examples of suitable appliances include any of a variety of household appliances such as dishwashers, washing machines, clothes dryers, refrigerators, freezers, ovens, ranges, cooktops, microwave ovens, trash compactors, air conditioners, water heaters or the like.

According to example implementations, the appliance 102 may be provisioned for connectivity to a local area network (LAN) 104. The LAN may be a wireless LAN (WLAN) such as a WLAN implementing one or more IEEE 802.11 standards. Or in some examples, the LAN may include a WLAN, and also a wired LAN such as a wired LAN implementing one or more IEEE 802.3 standards. The LAN may at times be simply referred to as a WLAN, but it should be understood that the LAN may also include a wired LAN. Also at times, the appliance may be referred to as a network-connected appliance.

The WLAN 104 may include appropriate networking hardware, some of which may be integral and others of which may be separate and interconnected. As shown, for example, the WLAN may include a wireless access point 106 configured to permit wireless devices including the appliance to connect to the WLAN. As also shown, for example, the WLAN may include a gateway device 108 such as a residential gateway configured to connect the WLAN to an external network 110 such as a wide area network (WAN) like the Internet. In some examples, the wireless access point or gateway device may include an integrated router to which other systems or devices may be connected. The WLAN may also include other integral or separate and connected networking hardware, such as a network switch, hub, digital subscriber line (DSL) modem, cable modem or the like.

In some examples, the system 100 may further include a service platform 112, which may be embodied as a computer system accessible by the WLAN 104 or external network 110 (shown). The service platform may include one or more servers, such as may be provided by one or more blade servers, a cloud computing infrastructure or the like. In some examples, the service platform may be embodied as a distributed computing apparatus including multiple computing devices, such as may be used to provide a cloud computing infrastructure. And in these examples, the computing devices that form the service platform may be in communication with each other via a network such as the external network.

The service platform 112 may be configured to provide one or more services for the network-connected appliance 102 and perhaps other network-connected appliances. For example, the service platform may be operated by a manufacturer of a network-connected appliance, a vendor of a network-connected appliance or another entity that may have an interest in the manufacture, distribution or maintenance of a network-connected appliance. The service platform may enable a user to access and use various features, such as features for management of a network-connected appliance. For example, a user may be able to remotely control one or more functionalities of a network-connected appliance, monitor operation of a network-connected appliance, initiate a service request for a network-connected appliance, and/or perform other management tasks via the service platform.

In some examples, the service platform 112 may be accessible by a user device 114 over the WLAN 104 and external network 110. The user device 114 may be embodied as any computing device configured to access the WLAN 104. By way of non-limiting example, the user device may be embodied as a personal computer (e.g., desktop computer, laptop computer), a mobile computing device (e.g., smart phone, tablet computer, digital camera) or the like. The user device may be configured to use any of a variety of wired or wireless (shown) network access technologies to access the WLAN.

The user device 114 may include or otherwise provide an installed application or other interface through which the service platform 112 may be accessible. This application or other interface may be or may be provided by a thin client and/or other client application, such as a web browser application through which a web page (e.g., service portal) provided by the service platform may be accessible. As another example, the application or other interface may be or may be provided by a dedicated application, such as a mobile app installed on a user device embodied as a mobile computing device.

In some examples, a user of the user device 114 may access the service platform 112 and register an account with the service platform, which may include setup of a unique identifier of the user account, such as a unique user name, email address or other identifier. In some examples, a user that has registered an account with the service platform may download an application to the user device through which the user may interact with the service platform, such as to manage the network-connected appliances 102 via the user device. A user my log-in to access their account with the service platform via the application and perform management functions from the user device. Additionally or alternatively, for example, the application may enable the user device to recognize and communicate with the network-connected appliance directly over the WLAN 104 without going through the service platform.

Once the user has registered an account, the user may associate (e.g., register) the network-connected appliance 102 that is owned by or otherwise associated with the user to the user's account with the service platform 112, which may enable user management of the network-connected appliance via the service platform. This may include, for example, establishing an association between the user account and a unique identifier of the appliance, such as a serial number, media access control (MAC) address, part number or other identifier. The association between the user account and identifier of the network-connected appliance may be maintained by the service platform to enable it to recognize and communicate with the network-connected appliance associated with a given user account.

In some examples, the network-connected appliance 102 may be additionally or alternatively provisioned with an identifier having a predefined association with the user account. This identifier may be known to the service platform 112, and when presented to the service platform by the network-connected appliance, the service platform may recognize that the network-connected appliance is associated with the user account with which the identifier is associated. The network-connected appliance of these examples may communicate with the service platform via the WLAN 104 and external network 110, and present the identifier to indicate the user account with which the network-connected appliance is associated.

In some more particular examples, a user may select via an application on the user device 114 or via the service platform 112 to establish a new association between the network-connected appliance 102 and the user's account. In response, the service platform may generate a virtual serial number (VSN) associated with the user's account, and provision the VSN to the user device. In turn, the user device may provision the VSN to the network-connected appliance, such as via the WLAN 104. The network-connected appliance may store the VSN and present it back to the service platform to establish the association between the network-connected appliance and the user's account.

In some other examples, the user device 114 may be configured to provision their user-account identifier (e.g., user name, email address) to the network-connected appliance 102. Similar to before, the network-connected appliance may store the user-account identifier and present it to the service platform 112 to establish the association between the association between the network-connected appliance and the user's account. Further examples of suitable manners by which the user device may provision an identifier to a network-connected appliance to enable establishment of an association between the network-connected appliance and a user account are provided in PCT Patent Application No. PCT/US2014/070560, entitled: *System, Method, Apparatus, and Computer Program Product for Configuring a Network Connected Appliance to Use Online Services*, filed Dec. 16, 2014, the content of which is incorporated by reference in its entirety. As also further described in the '560 application, in some examples, the system 100 may further include one or more home automation systems connected to the WLAN 104 and/or external network 110, and with which the network-connected appliance may be configured to operate.

In accordance with example implementations, in order to connect the appliance 102 to the WLAN 104 and in turn the service platform 112 that with which the user has registered an account, the appliance may be provisioned with credentials enabling the appliance to access the WLAN. These credentials may include a service set identifier (SSID) that identifies the WLAN (e.g., "HomeWiFi"), and if configured, a password for user authentication to gain access to the WLAN. An example of a suitable manner according to which the appliance may be provisioned with these credentials will now be described with reference to FIGS. 2A-2C.

Figure 2A:
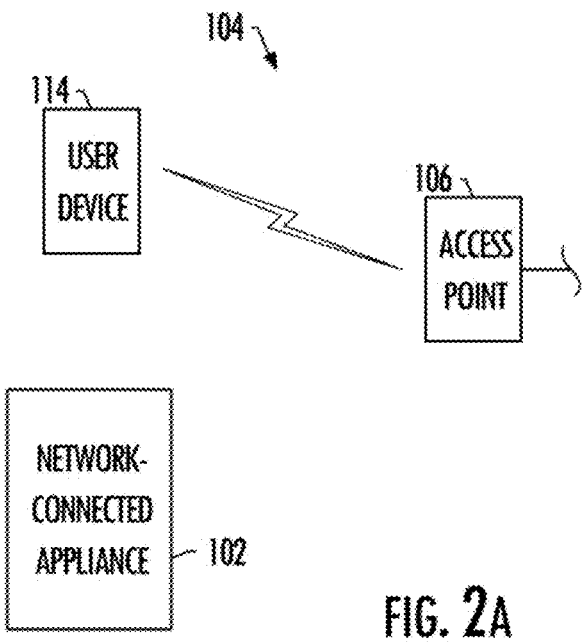
FIGS. 2A-2C illustrate a suitable manner according to which an appliance may be provisioned with credentials enabling the appliance to access a wireless local area network (WLAN), according to various example implementations of the present disclosure.

As shown in FIG. 2A, the user device 114 may possess the appropriate credentials to access and thereby connect to the WLAN 104. In its original, factory-default state, the appliance 102 may be without the appropriate credentials to access and thereby connect to the WLAN. In this state, the appliance may be initially configured to operate as a WLAN access point.

Figure 2B:
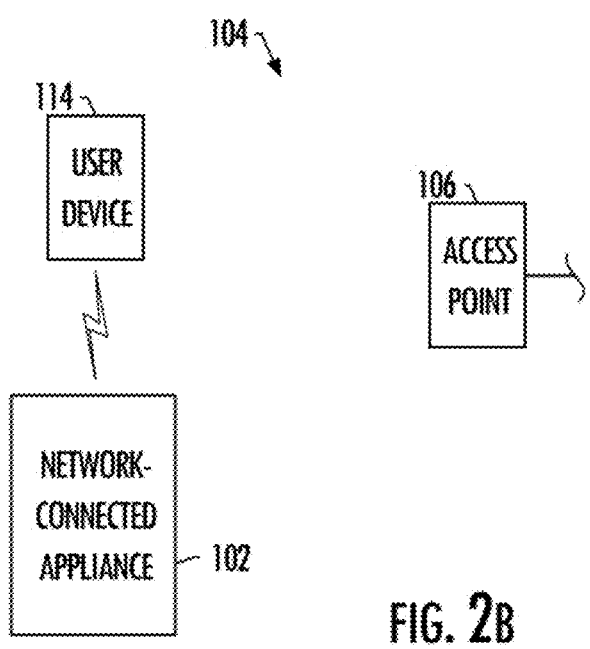
Figure 3A:
FIGS. 3A-3G illustrate displays that may be presented in a graphical user interface (GUI) provided by an application throughout the provisioning process, according to various example implementations of the present disclosure.
Figure 3D:
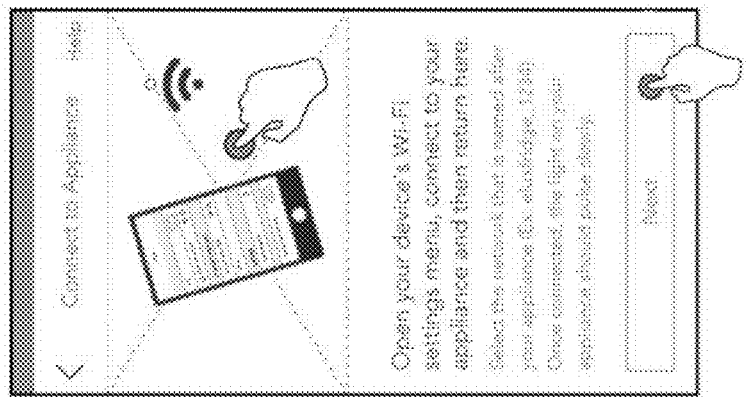
Figure 3C:
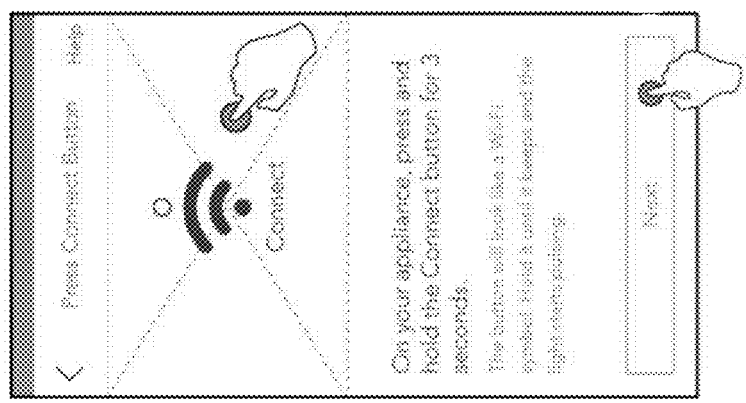
Figure 3B:
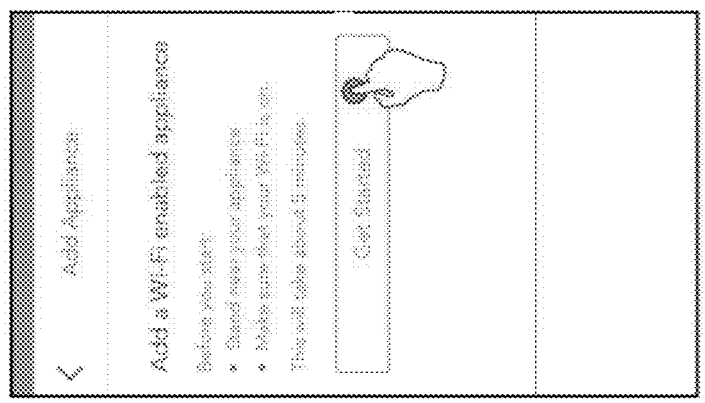

To provision the appliance 102, a user may initiate an appropriate application (e.g., web browser, dedicated application) on the user device 114. Example displays that may be presented in a graphical user interface (GUI) provided by the application throughout the provisioning process are shown in FIGS. 3A-3G. As shown in FIG. 3A, for example, through the application, the user may access the service platform 112, and login to their account with the service platform. As shown in FIGS. 3B and 3C, the user may be directed actuate an appropriate control (e.g., physical button or graphical control element) on the appliance, and this actuation may cause the appliance for a short period of time to broadcast a SSID of its own (e.g., "Appliance_Network"). As shown in FIG. 2B, the user device may discover the broadcast SSID and thereby the appliance, and connect to the appliance as a WLAN station using the SSID. Direction for this may be as shown in FIG. 3D. In some examples, this discovery of and connection to the appliance by the user device occurs without authentication of the user device or appliance to the other and without user authentication to either the user device or appliance.

Figure 3G:
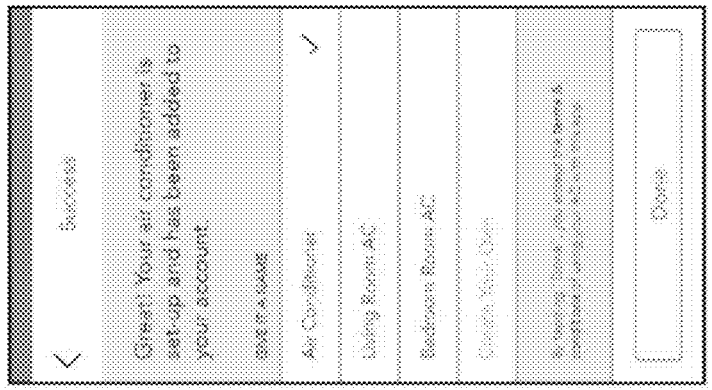
Figure 3F:
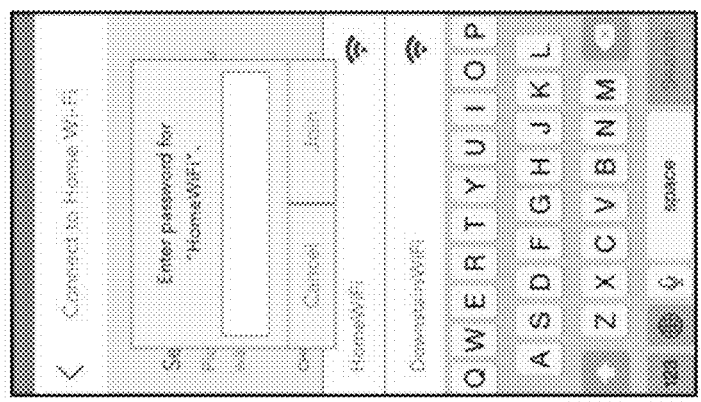
Figure 3E:
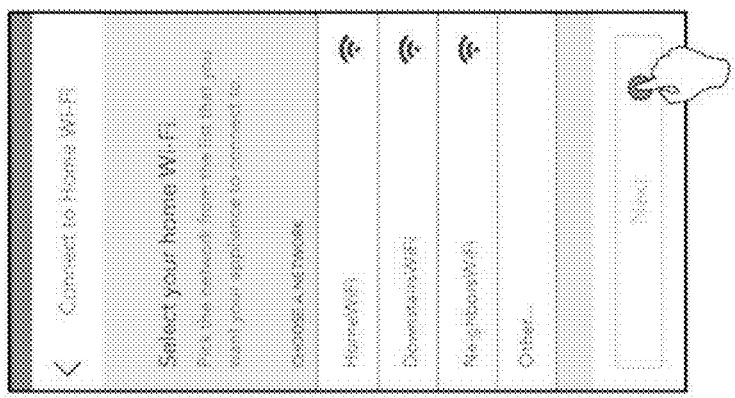

Once the user device 114 has connected to the appliance 102, the application on the user device may be used to wirelessly provision the appliance with the credentials for the WLAN 104 (e.g., HomeWiFi). Over the connection between the user device and appliance, the application may send a command to cause the appliance to scan for available WLANs (including HomeWiFi). The appliance may then send the SSIDs of the available WLANs to the application for display and user selection of a WLAN such as Home-WiFi, such as shown in FIG. 3E. In instances in which HomeWiFi has a configured password requirement, the application may prompt the user for the password, such as shown in FIG. 3F. The user may manually enter the password. The application may then send the SSID and password (if so configured/required) for HomeWiFi to the appliance over the connection between the user device and the appliance. In some examples, this provisioning may be concurrent with establishing association between the appliance and user's account with the service platform 112. In these examples, the application may further send a VSN associated with the user's account or the user-account identifier (e.g., user name, email address) to the appliance.

Figure 2C:
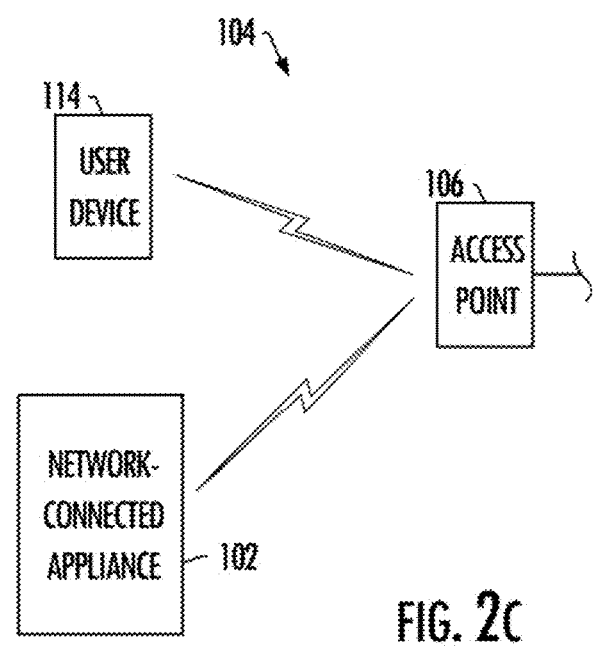

As shown in FIG. 2C, the appliance 102 may drop the connection with the user device 114, switch from operating as a WLAN access point for Appliance_Network to operating as a WLAN station, and connect directly to the access point 106 and through it the WLAN 104 (e.g., HomeWiFi) using the SSID and password (if so configured/required). And either concurrently or sometime thereafter, the appliance may connect to the service platform 112, identify itself and send the VSN or user-account identifier to the service platform to enable the service platform to bind the appliance to the user's account (associate the appliance and user's account). The service platform may then notify the user that the appliance has been successfully associated with their account, such as shown in FIG. 3G.

In some examples, the application installed on the user device 114 may further coordinate with user-interface indicators on the appliance 102. For example, the appliance may include one or more light-emitting diodes (LEDs) or other display indicators that may indicate a provisioning state. When the appliance is operating as a WLAN access point in the initial un-configured, factory-default state, the appliance may provide a visual indication of this state, such as illumination of an LED having a first color or an LED blinking with a particular pattern. If the appliance has been successfully provisioned with credentials and has connected to the WLAN 104, the appliance may provide a different visual indication of this state, such as illumination of an LED having a second color or an LED blinking with a particular pattern (including not blinking at all, but rather just illuminating with a steady, non-blinking light). If there is an error in provisioning, the appliance may indicate the error, such as by illumination of an LED having a third color or an LED blinking with a particular pattern. In some examples, the application may prompt the user to select the state indicated via the appliance (e.g., the color of LED illuminated and/or the blinking pattern) in order to confirm that the appliance has been successfully provisioned or to troubleshoot any errors.

Figure 4:
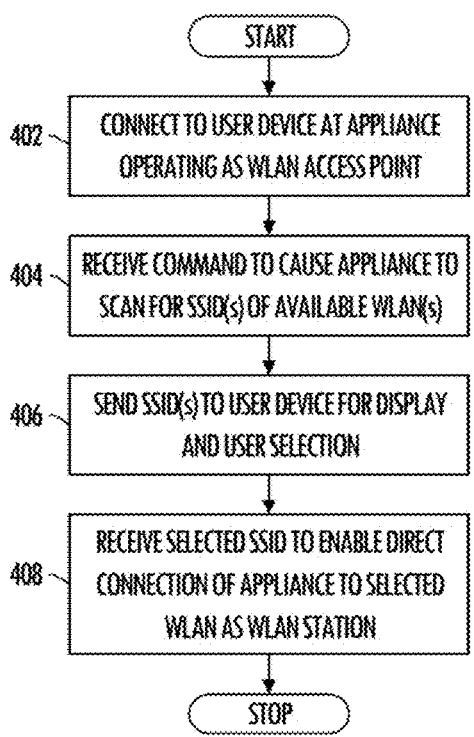
FIGS. 4 and 5 are flowcharts illustrating various operations in respective methods according to some example implementations.

FIG. 4 is a flowchart illustrating various steps in a method 400 of provisioning an appliance for network connectivity, according to some example implementations of the present disclosure. The method of FIG. 4 may include a number of operations performed at the appliance. As shown at 402, the method may include connecting to a user device at the appliance configured to operate as a WLAN access point, and thereby establishing a wireless connection with the user device. In some examples, connecting to the user device may occur without authentication of the user device or appliance to the other and without user authentication to either the user device or appliance.

The method may include receiving a command over the wireless connection from the user device to cause the appliance to scan for one or more available WLANs and obtain service set identifiers (SSIDs) of the available WLAN (s), as shown in block 404. The method may include sending the SSID(s) over the wireless connection to the user device for display and user selection of a selected SSID of the SSID(s), where the selected SSID is of a selected WLAN of the available WLAN(s), as shown in block 406. And the method may include receiving the selected SSID over the wireless connection from the user device to enable the appliance to connect directly to the selected WLAN as a WLAN station using the selected SSID, as shown in block 408.

In some examples, the user device may be configured to prompt the user for a password for the selected WLAN, and receive the password manually entered by the user. In these examples, receiving the selected SSID may include receiving the selected SSID and the password from the user device to enable the appliance to connect directly to the selected WLAN as a WLAN station using the selected SSID. In some further examples, receiving the selected SSID and the password from the user device may include receiving the selected SSID, the password and an identifier associated with a user account with a service platform configured to provide one or more services for the appliance. And in these examples, the method may further include at the appliance, sending the identifier to the service platform via the selected WLAN to enable the service platform to bind the appliance to the user account.

In some examples, receiving the selected SSID from the user device may more generally include receiving the selected SSID and an identifier associated with a user account with a service platform configured to provide one or more services for the appliance. In these examples, the method may further include at the appliance, sending the identifier to the service platform via the selected WLAN to enable the service platform to bind the appliance to the user account.

Figure 5:
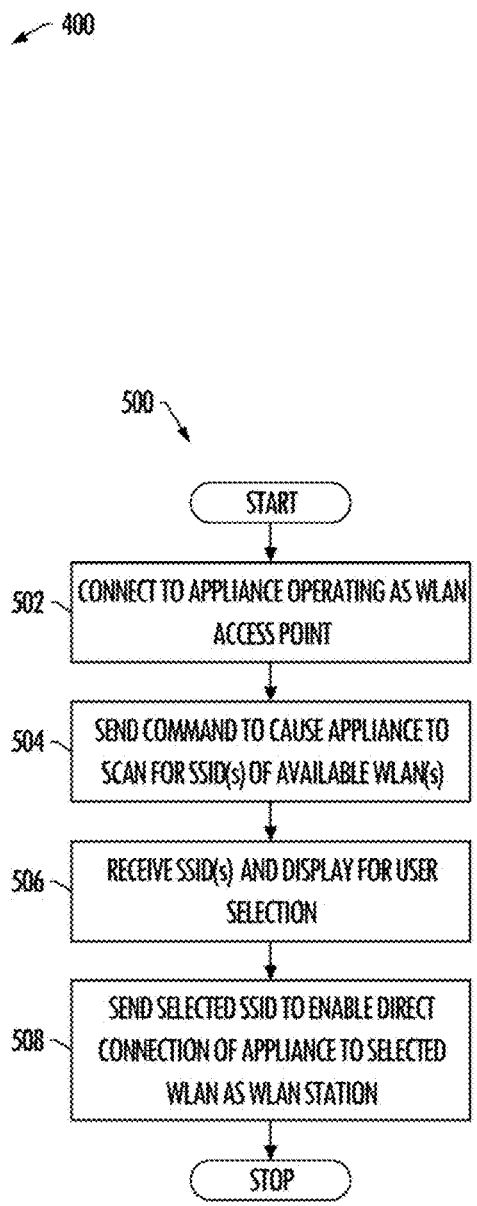

FIG. 5 is a flowchart illustrating various steps in a method 500 of provisioning an appliance for network connectivity, according to some example implementations of the present disclosure. The method of FIG. 5 may include a number of operations performed at a user device. As shown at block 502, the method may include connecting to the appliance configured to operate as a WLAN access point, and thereby establishing a wireless connection with the appliance. In some examples, connecting to the appliance may occur without authentication of the user device or appliance to the other and without user authentication to either the user device or appliance.

The method may include sending a command over the wireless connection to the appliance to cause the appliance to scan for one or more available WLANs and obtain service set identifiers (SSIDs) of the available WLAN(s), as shown in block 504. The method may include receiving the SSID(s) over the wireless connection from the appliance, as shown in block 506. The method may include displaying the SSID(s) for user selection of a selected SSID of the SSID(s), the selected SSID being of a selected WLAN of the available WLAN(s), as also shown in block 506. And the method may include sending the selected SSID to the appliance to enable the appliance to connect directly to the selected WLAN as a WLAN station using the selected SSID, as shown in block 508.

In some examples, the method may further include at the user device, prompting the user for a password for the selected WLAN, and receiving the password manually entered by the user. In these examples, sending the selected SSID may include sending the selected SSID and the password to the appliance to enable the appliance to connect directly to the selected WLAN as a WLAN station using the selected SSID. In some further examples, sending the selected SSID and the password to the appliance may include sending the selected SSID, the password and an identifier associated with a user account with a service platform configured to provide one or more services for the appliance. In these examples, the appliance may be configured send the identifier to the service platform via the selected WLAN to enable the service platform to bind the appliance to the user account.

In some examples, sending the selected SSID to the appliance may more generally include sending the selected SSID and an identifier associated with a user account with a service platform configured to provide one or more services for the appliance. In these examples, the appliance may be configured send the identifier to the service platform via the selected WLAN to enable the service platform to bind the appliance to the user account.

According to example implementations of the present disclosure, the system 100 and its components including the network-connected appliance 102 and user device 114 may be implemented by various means. Examples of suitable means include hardware, alone or under direction of one or more computer program code instructions, program instructions or executable computer-readable program code instructions from a computer-readable storage medium.

In some examples, one or more apparatuses may be provided that are configured to function as or otherwise implement the network-connected appliance 102 and user device 114 or various functionality thereof. In some examples, an apparatus may be provided that is configured to implement network-connectivity functionality of the network-connected appliance. This apparatus may at times be referred to as a network interface unit (NIU), and it may be integral with or otherwise directly connected to the appliance to enable its network connectivity.

Figure 6:
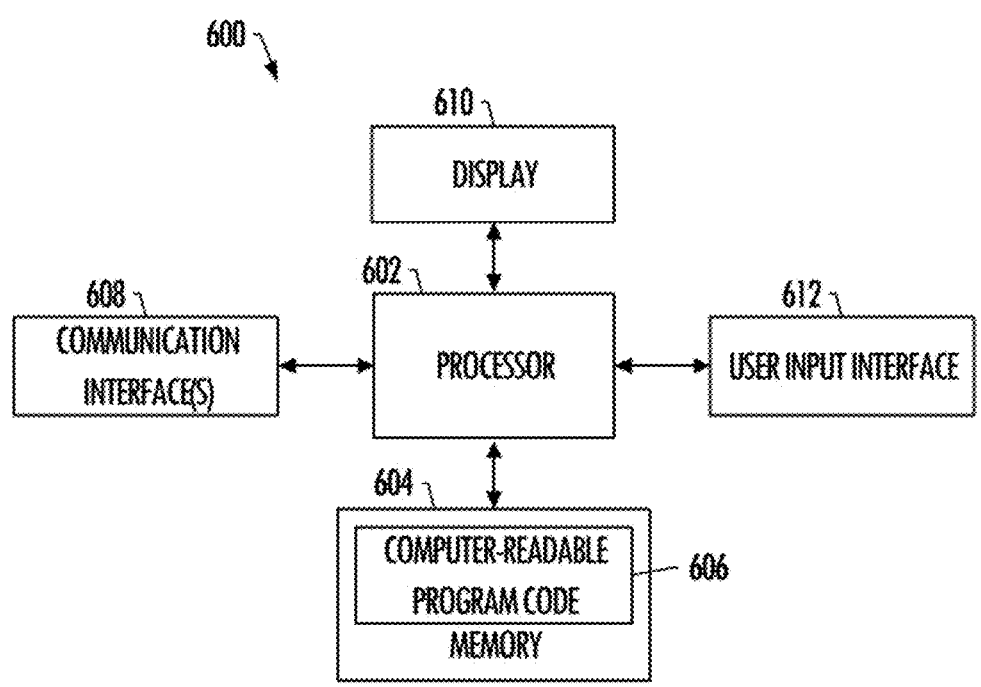
FIG. 6 illustrates an apparatus according to some example implementations.

FIG. 6 illustrates an apparatus 600 according to some example implementations of the present disclosure. In some examples, the apparatus may be configured to implement a NIU integral with or otherwise directly connected to an appliance (e.g., appliance 102). In other examples, the apparatus may be configured to implement a user device (e.g., user device 114). As shown, the apparatus may include one or more of each of a number of components such as, for example, a processor 602 connected to a memory 604.

The processor 602 is generally any piece of computer hardware that is capable of processing information such as, for example, data, computer-readable program code, instructions or the like (at times generally referred to as "computer programs," e.g., software, firmware, etc.), and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 604 (of the same or another apparatus). In other examples, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 604 is generally any piece of computer hardware that is capable of storing information such as, for example, data, computer programs (e.g., computer-readable program code 606) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 604, the processor 602 may also be connected to one or more interfaces for displaying, transmitting and/or receiving information. The interfaces may include a communications interface 608 and/or one or more user interfaces. In some examples, particularly in instances in which the apparatus 600 is configured to implement a NIU, the apparatus may not include a separate user interface, and may instead interact with one provided by the appliance. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 610 and/or one or more user input interfaces 612. The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, mouse, joystick, touch-sensitive surface (e.g., touchpad, touchscreen), biometric sensor or the like.

As indicated above, program code instructions may be stored in memory, and executed by a processor, to implement functions described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 600 may include a processor 602 and a computer-readable storage medium or memory 604 coupled to the processor, where the processor is configured to execute computer-readable program code 606 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus integral with or directly coupled to an appliance, the apparatus comprising a processor and a memory storing executable instructions that in response to execution by the processor cause the apparatus and thereby the appliance to at least:
   connect to a user device at the apparatus configured to operate as a wireless local area network (WLAN) access point, and thereby establish a wireless connection with the user device;
   receive a command over the wireless connection from the user device to cause the apparatus to scan for one or more available WLANs and obtain one or more service set identifiers (SSIDs) of the one or more available WLANs;
   send the one or more SSIDs over the wireless connection to the user device for display and user selection of a selected SSID of the one or more SSIDs, the selected SSID being of a selected WLAN of the one or more available WLANs; and
   receive the selected SSID over the wireless connection from the user device to enable the apparatus to connect directly to the selected WLAN as a WLAN station using the selected SSID.

2. The apparatus of claim 1, wherein the user device is configured to prompt the user for a password for the selected WLAN, and receive the password manually entered by the user, and
   wherein the apparatus being caused to receive the selected SSID includes being caused to receive the selected SSID and the password from the user device to enable the appliance to connect directly to the selected WLAN as a WLAN station using the selected SSID.

3. The apparatus of claim 2, wherein the apparatus being caused to receive the selected SSID and the password from the user device includes being caused to receive the selected SSID, the password and an identifier associated with a user account with a service platform configured to provide one or more services for the appliance, and wherein the memory stores further executable instructions that in response to execution by the processor cause the apparatus and thereby the appliance to further send the identifier to the service platform via the selected WLAN to enable the service platform to bind the appliance to the user account.

4. The apparatus of claim 1, wherein the apparatus being caused to receive the selected SSID from the user device includes being caused to receive the selected SSID and an identifier associated with a user account with a service platform configured to provide one or more services for the appliance, and wherein the memory stores further executable instructions that in response to execution by the processor cause the apparatus and thereby the appliance to further send the identifier to the service platform via the selected WLAN to enable the service platform to bind the appliance to the user account.

5. The apparatus of claim 1, wherein the apparatus is caused to connect to the user device without authentication of the user device or appliance to the other and without user authentication to either the user device or appliance.

6. An apparatus comprising a processor and a memory storing executable instructions that in response to execution by the processor cause the apparatus to at least:

connect to the appliance configured to operate as a wireless local area network (WLAN) access point, and thereby establish a wireless connection with the appliance;

send a command over the wireless connection to the appliance to cause the appliance to scan for one or more available WLANs and obtain one or more service set identifiers (SSIDs) of the one or more available WLANs;

receive the one or more SSIDs over the wireless connection from the appliance;

display the one or more SSIDs for user selection of a selected SSID of the one or more SSIDs, the selected SSID being of a selected WLAN of the one or more available WLANs; and send the selected SSID over the wireless connection to the appliance to enable the appliance to connect directly to the selected WLAN as a WLAN station using the selected SSID.

7. The apparatus of claim 6, wherein the memory stores further executable instructions that in response to execution by the processor cause the apparatus to further prompt the user for a password for the selected WLAN, and receive the password manually entered by the user, and wherein the apparatus being caused to send the selected SSID includes being caused to send the selected SSID and the password to the appliance to enable the appliance to connect directly to the selected WLAN as a WLAN station using the selected SSID.

8. The apparatus of claim 7, wherein the apparatus being caused to send the selected SSID and the password to the appliance includes being caused to send the selected SSID, the password and an identifier associated with a user account with a service platform configured to provide one or more services for the appliance, the appliance being configured send the identifier to the service platform via the selected WLAN to enable the service platform to bind the appliance to the user account.

9. The apparatus of claim 6, wherein the apparatus being caused to send the selected SSID to the appliance includes being caused to send the selected SSID and an identifier associated with a user account with a service platform configured to provide one or more services for the appliance, the appliance being configured send the identifier to the service platform via the selected WLAN to enable the service platform to bind the appliance to the user account.

10. The apparatus of claim 6, wherein the apparatus is caused to connect to the appliance without authentication of the apparatus or appliance to the other and without user authentication to either the apparatus or appliance.

11. A method of provisioning an appliance for network connectivity, the method comprising at the appliance:

connecting to a user device at the appliance configured to operate as a wireless local area network (WLAN) access point, and thereby establishing a wireless connection with the user device;

receiving a command over the wireless connection from the user device to cause the appliance to scan for one or more available WLANs and obtain one or more service set identifiers (SSIDs) of the one or more available WLANs;

sending the one or more SSIDs over the wireless connection to the user device for display and user selection of a selected SSID of the one or more SSIDs, the selected SSID being of a selected WLAN of the one or more available WLANs; and receiving the selected SSID over the wireless connection from the user device to enable the appliance to connect directly to the selected WLAN as a WLAN station using the selected SSID.

12. The method of claim 11, wherein the user device is configured to prompt the user for a password for the selected WLAN, and receive the password manually entered by the user, and wherein receiving the selected SSID includes receiving the selected SSID and the password from the user device to enable the appliance to connect directly to the selected WLAN as a WLAN station using the selected SSID.

13. The method of claim 12, wherein receiving the selected SSID and the password from the user device includes receiving the selected SSID, the password and an identifier associated with a user account with a service platform configured to provide one or more services for the appliance, and wherein the method further comprises at the appliance, sending the identifier to the service platform via the selected WLAN to enable the service platform to bind the appliance to the user account.

14. The method of claim 11, wherein receiving the selected SSID from the user device includes receiving the selected SSID and an identifier associated with a user account with a service platform configured to provide one or more services for the appliance, and wherein the method further comprises at the appliance, sending the identifier to the service platform via the selected WLAN to enable the service platform to bind the appliance to the user account.

15. The method of claim 11, wherein connecting to the user device occurs without authentication of the user device or appliance to the other and without user authentication to either the user device or appliance.

16. A method of provisioning an appliance for network connectivity, the method comprising at a user device:

connecting to the appliance configured to operate as a wireless local area network (WLAN) access point, and thereby establishing a wireless connection with the appliance;

sending a command over the wireless connection to the appliance to cause the appliance to scan for one or more available WLANs and obtain one or more service set identifiers (SSIDs) of the one or more available WLANs;

receiving the one or more SSIDs over the wireless connection from the appliance;

displaying the one or more SSIDs for user selection of a selected SSID of the one or more SSIDs, the selected SSID being of a selected WLAN of the one or more available WLANs; and sending the selected SSID over the wireless connection to the appliance to enable the appliance to connect directly to the selected WLAN as a WLAN station using the selected SSID.

17. The method of claim 16 further comprising at the user device:

prompting the user for a password for the selected WLAN, and receiving the password manually entered by the user, wherein sending the selected SSID includes sending the selected SSID and the password to the appliance to enable the appliance to connect directly to the selected WLAN as a WLAN station using the selected SSID.

18. The method of claim 17, wherein sending the selected SSID and the password to the appliance includes sending the selected SSID, the password and an identifier associated with a user account with a service platform configured to provide one or more services for the appliance, the appliance being configured send the identifier to the service platform via the selected WLAN to enable the service platform to bind the appliance to the user account.

19. The method of claim 16, wherein sending the selected SSID to the appliance includes sending the selected SSID and an identifier associated with a user account with a service platform configured to provide one or more services for the appliance, the appliance being configured send the identifier to the service platform via the selected WLAN to enable the service platform to bind the appliance to the user account.

20. The method of claim 16, wherein connecting to the appliance occurs without authentication of the user device or appliance to the other and without user authentication to either the user device or appliance.

* * * * *